US006015469A

United States Patent [19]

Fenzi

[11] Patent Number: 6,015,469

[45] Date of Patent: Jan. 18, 2000

[54] PROCESS FOR THE PRODUCTION OF A SUPPORT FOR SUBLIMABLE COLOR TRANSFER FOR DECORATING ITEMS OR ARTIFACTS FROM METAL, PLASTIC MATERIALS AND THE LIKE

[75] Inventor: Giancarlo Fenzi, Cazzano di Tramigna, Italy

[73] Assignee: V.I.V. International S.P.A., Cazzano di Tramigna, Italy

[21] Appl. No.: 09/018,586

[22] Filed: Feb. 4, 1998

[30] Foreign Application Priority Data

Feb. 6, 1997 [IT] Italy ................................ MI97A0231

[51] Int. Cl.[7] ........................... B44C 1/165; B32B 31/00; B41M 3/12

[52] U.S. Cl. .......................... 156/230; 156/235; 156/237; 156/238; 156/240; 156/247; 427/146; 427/148

[58] Field of Search .................................... 156/230, 234, 156/235, 237, 238, 239, 240, 241, 247, 277, 289; 427/146, 148

[56] References Cited

U.S. PATENT DOCUMENTS 4,383,878 5/1983 Young et al. ........................... 156/235
4,976,805 12/1990 Ishii et al. ............................... 156/100
5,342,818 8/1994 Imai et al. .............................. 503/227

FOREIGN PATENT DOCUMENTS

MI96A1793 8/1996 Italy .

*Primary Examiner*—Richard Crispino
*Assistant Examiner*—J. A. Lorengo
*Attorney, Agent, or Firm*—Collard & Roe, P.C.

[57] ABSTRACT

Process for the production of a flexible support for sublimable colour transfer for decorating various metal items with the transfer technique, comprising the steps of preparation of a metal matrix by photoengraving or the like, application of a sublimable colour decoration by means of said matrix on a support from flexible non extensible material such as polythene or the like according to known rotogravure techniques or the like; and transfer from said polythene support to a flexible support such as fabric, non-woven fabric, and the like, by causing the contact of the two supports by heat compression; flexible support so obtained and apparatus for the realization of the same.

5 Claims, No Drawings

PROCESS FOR THE PRODUCTION OF A SUPPORT FOR SUBLIMABLE COLOR TRANSFER FOR DECORATING ITEMS OR ARTIFACTS FROM METAL, PLASTIC MATERIALS AND THE LIKE

The present invention relates to a process for the realisation of a transfer support for sublimable colour transfer to be used for the decoration of items from metal, plastic materials and the like, with the transfer decoration technique.

The invention also relates to a support for sublimable colour transfer so obtained, as well as to the apparatus for the realisation of the same. Processes are known for the production of items of various type, also having a complicated profile, and in particular variously decorated large size sections, which processes involve the steps of winding up the item or the artifact, previously surface treated by pre-painting, anodic oxidisation or the like, in a sublimable transfer support carrying the decorations desired; covering the item wound up in the support with a rubber membrane or the like; creating vacuum through suitable ducts between the membrane and the artifact wound up in the support, on prior interposition of means suitable to ensure air flow and escape, so as to cause the support to adhere uniformly to the shape of the artifact, and permanently yielding means suitable for uniforming the pressure exercised by the membrane; and lastly, heating the whole to realise in this way the transfer of colours and therefore the pattern and the polymerisation of colours.

A process is also known of the same Applicant, Verniciatura Industriale Veneta S.p.A., which was the subject matter of the Italian patent application n. MI96A001793, filed on 28.08.1996, and which allows to obtain variously decorated large size artifacts also for outdoor uses, particularly from metal, provided with one- or multicolour decorations, such as geometric decorations, floral decorations, imitation wood, imitation marble, and also comprising complex patterns.

The process comprises a step of pre-treatment and preparation of the artifact surface, a possible pre-painting step and a decoration step, which consists in the application of a decoration on the surface of the pre-treated items by transfer from a sublimable colour flexible support, which in case of artifacts constituted by sections of a length of up to 20 meters, unwinds from a coil, through the action of temperature and/or pressure generated by a rotary nip roller made from elastically yielding and suitably shaped, heated and thermostated material, followed by a final step of sublimation and fixing of the colours and therefore the decoration.

As is known, the transfer support is constituted by a sheet or strip from paper, fabric or the like, one face of which carries, using sublimable colours, the decoration to be transferred afterwards on the item to be decorated.

To transfer the decoration on the support a silk-screen process is usually utilised according to which the colour is spread on a matrix kept in touch with the support surface, constituted by a fabric previously covered with sealing material which leaves uncovered only the shape of the ornament to be transferred on the support. The colour, under the pressure of a special spatula, filters through the extremely small holes of the fabric weft and deposits on the support. With the silk-screen process, the fibres that make up the matrix are subject to a marked wear due to the effect of the pressure exercised by the spatula at each passage, and besides the same matrix is deformable due to mechanical stress.

It has been actually found that by using transfer supports according to the known art, the decoration transferred on the artifact shows often defects, such as deformations of the profile, burrs, diffusion and superposition of colours, and the like.

It is an object of this invention to realise a process for the production a sublimable colour transfer support to be used for the decoration of various items by means of the transfer technique allowing to reproduce on the artifacts to be decorated decoration with sharp profiles, free from burrs, colour superpositions and the like.

It is a further object of this invention to realise and provide a transfer support allowing to reproduce on the artifacts to be decorated, in particular on metal sections for building and the like of a length of up to 20 m, decorations free from defects such as deformations of the profile, burrs, diffusion and superposition of colours, and the like.

These and still other objects and related advantages which will become apparent from the following description are achieved by a process for the production of a flexible support for the transfer of sublimable colours to be used for the realisation of a decoration on the surface of various items from metal, plastic materials and the like, such as metal sections from light alloys, rolled sections, artifacts for town fixtures and the like through the transfer technique, which process, according to the present invention, comprises the following steps:

- preparation of an engraved metal matrix carrying an impression equal to said decoration by means of known techniques such as photoengraving and the like;
- application of said decoration realised with sublimable inks on a sheet or a strip from flexible non extensible material, according to known inking techniques, by means of said metal matrix;
- transfer of said decoration from said flexible non extensible sheet or strip to a sheet or strip from flexible material, by heat compression of said flexible non extensible sheet or strip against said sheet or a strip from flexible material, obtaining a flexible transfer support carrying said sublimable colour decoration.

More particularly, said sheet or strip from flexible non extensible material is polyethylene and the transfer of said decoration to said sheet or strip from flexible material by heat compression is carried out at a temperature comprised between 100 and 150° C., in any case at a temperature lower than the softening temperature of polyethylene or any other plastic material utilised.

Said strip from flexible material is a strip realised from fabric or non-woven fabric or the like.

As has been found, said flexible support for sublimable colour transfer obtained in this manner, suitable to withstand high temperatures of up to 300° C., at which temperature there takes place the sublimation of colours and their transfer on the surface of the artifact to be decorated, allows to realise on any artifacts or items any type of decoration, even of a complicated pattern, free from defects such as deformations of the pattern profile, burrs, colour superposition and the like.

The process according to the present invention has proved to be particularly advantageous for the realisation of a strip-like flexible support from fabric, non-woven fabric or the like, to be used for the decoration of sections according to the process subject matter of the already mentioned patent application MI96A001793.

In particular, an apparatus for the realisation of a strip-like flexible support according to the present invention comprises:

a rotary, cylindrical metal matrix, carrying an impression corresponding to said decoration, sucking from a tray containing said sublimable ink and provided with a device such as a doctor, a spatula or the like, suitable to remove the excess ink from the surface of said matrix;

a first roller around which there unwinds said strip from non extensible, flexible material, such as polyethylene or the like, kept in touch against the surface of said cylindrical matrix, so that the decoration is transferred on the surface of said strip according to known techniques such as rotogravure and the like;

a second roller around which there rewinds said strip from flexible material such as polyethylene or the like carrying said sublimable ink decoration;

a nip roller heated at a temperature comprised between 100 and 150° C., suitable to keep said strip from non extensible flexible material carrying said decoration unwinding from said second roller against the surface of a strip from flexible material such as fabric, non-woven fabric or the like unwinding from a third roller in such a manner that said decoration is transferred on said strip from flexible material winding up on a fourth roller.

According to a variant of the present invention, the decoration or pattern to be transferred that is present on the surface of said flexible support, which surface is intended for getting in touch with the surface of the item to be decorated, is covered with a thin layer of glue suitable to constitute a support for the decoration on the surface of the item and at the same time a protective layer of the same surface.

According to still a further variant of the invention, between the surface of said flexible support, for instance from fabric, and the layer constituted by the decoration there is interposed a transparent film suitable to constitute a protection for the decoration, once the latter has been transferred on the surface of the item to be decorated.

I claim:

1. A process for the production of a flexible transfer support for sublimable color transfer to be used to realize a decoration on the surface of various items from metal, or plastic materials, such as metal sections from light alloys, rolled sections, artifacts for town fixtures through the transfer technique, which process, comprises the following steps:

preparing an engraved metal matrix carrying an impression equal to said decoration;

applying said decoration realized with sublimable inks on a sheet or a strip from flexible non-extensible material, by means of said engraved metal matrix carrying said impression equal to said decoration;

transferring said decoration from said flexible non-extensible sheet or strip to a sheet or strip from flexible material, selected from the group consisting of fabric or non-woven fabric, by heat compression of said flexible non-extensible sheet or strip against said sheet or strip from flexible material, obtaining a flexible transfer support carrying said sublimable color decoration.

2. The process according to claim 1, wherein said sheet or strip from non-extensible flexible material is made from polyethylene and that the transfer of said decoration to said sheet or strip from flexible material by heat compression is carried out at a temperature comprised between 100 and 150° C.

3. An apparatus for the realization of a flexible strip-like support comprising a rotary, cylindrical metal matrix, carrying an impression corresponding to a decoration, sucking from a tray containing sublimable ink and provided with a device such as a doctor, or a spatula, suitable to remove the excess ink from the surface of s aid matrix;

a first roller around which there unwinds a strip from non-extensible, flexible material, kept in touch against the surface of said cylindrical matrix, so that the decoration is transferred on the surface of said strip;

a second roller around which there rewinds said strip from non-extensible flexible material carrying said sublimable ink decoration;

a nip roller heated at a temperature comprised between 100 and 150° C., suitable to keep said strip from non-extensible flexible material carrying said decoration unwinding from said second roller against the surface of a strip from flexible material selected from the group consisting of fabric or non-woven fabric unwinding from a third roller in such a manner that said decoration is transferred on said strip from flexible material winding up on a fourth roller.

4. The process according to claim 1, wherein said decoration or a pattern to be transferred that is present on the surface of said flexible support, which surface is intended for getting in touch with the surface of the item to be decorated, is covered with a thin layer of glue.

5. The process according to claim 1, wherein a transparent film is interposed between the surface of said flexible support and the layer constituted by the decoration.

* * * * *